(12) United States Patent
Park et al.

(10) Patent No.: US 8,923,234 B2
(45) Date of Patent: Dec. 30, 2014

(54) METHOD FOR MEASURING A NEIGHBORING CELL AND AN APPARATUS THEREOF

(71) Applicant: LG Electronics Inc., Seoul (KR)

(72) Inventors: Hanjun Park, Anyang-si (KR); Hanbyul Seo, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 13/646,293

(22) Filed: Oct. 5, 2012

(65) Prior Publication Data

US 2013/0088985 A1    Apr. 11, 2013

Related U.S. Application Data

(60) Provisional application No. 61/543,812, filed on Oct. 6, 2011.

(51) Int. Cl.
| | |
|---|---|
| H04W 4/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 48/16 | (2009.01) |
| H04W 36/00 | (2009.01) |

(52) U.S. Cl.
CPC .......... *H04W 48/16* (2013.01); *H04W 36/0088* (2013.01)
USPC ............ 370/329; 370/252; 370/328; 370/331

(58) Field of Classification Search
None
See application file for complete search history.

(56) References Cited

U.S. PATENT DOCUMENTS

| | | | |
|---|---|---|---|
| 2009/0005029 A1* | 1/2009 | Wang et al. | 455/423 |
| 2009/0168731 A1* | 7/2009 | Zhang et al. | 370/336 |
| 2010/0034126 A1* | 2/2010 | Kitazoe et al. | 370/310 |
| 2010/0197300 A1* | 8/2010 | Van Der Velde et al. | 455/425 |
| 2011/0080962 A1* | 4/2011 | Blankenship et al. | 375/259 |
| 2011/0274007 A1* | 11/2011 | Lin et al. | 370/254 |
| 2013/0235738 A1* | 9/2013 | Siomina et al. | 370/252 |

* cited by examiner

*Primary Examiner* — Faruk Hamza
*Assistant Examiner* — Diane Lo
(74) *Attorney, Agent, or Firm* — McKenna Long & Aldridge LLP (57) ABSTRACT

A method of performing intra-frequency cell measurement by a user equipment (UE) in a wireless communication system is disclosed. The method includes determining a measurement gap for the intra-frequency cell measurement based on downlink control information received from an eNB, and performing the intra-frequency cell measurement for a neighboring cell during the measurement gap. The measurement gap corresponds to one or more downlink subframes other than a downlink subframe having downlink data for the UE indicated by the downlink control information.

14 Claims, 10 Drawing Sheets

METHOD FOR MEASURING A NEIGHBORING CELL AND AN APPARATUS THEREOF

This application claims the benefit of U.S. Provisional Application Ser. No. 61/543,812, filed on Oct. 6, 2011, which is hereby incorporated by reference as if fully set forth herein.

BACKGROUND OF THE INVENTION

1. Field of the Invention

The present invention relates to channel estimation and physical layer measurement and, more particularly, to a method of adaptively using a single estimator over time resources according to an object to be estimated and measured when channel estimation and physical layer measurement are performed in downlink.

2. Discussion of the Related Art

An LTE-Advanced system supports a machine type communication (MTC) terminal capable of transmitting information necessary for managing the system between apparatuses configuring the system, for applications such as smart metering, health care, security, transport and logistics, and environmental monitoring. The MTC terminal is characterized in that a low data transfer rate is supported for the purpose of management and monitoring and a large number of terminals may operate in one cell. Accordingly, the MTC terminal is preferably implemented in a low-level, low-cost terminal and, at this time, a method of simplifying an estimation and measurement operation performed by an MTC terminal may be considered.

In general, physical layer measurement of an LTE system is roughly divided into two methods: an intra-frequency measurement method and an inter-frequency measurement method. Information about the measurement method is determined by an eNB and may be sent to a user equipment (UE) via a broadcast control channel or a dedicated control channel. For example, the UE follows a measurement method defined for cell selection in a broadcast control signal in an RRC_IDLE state and follows a measurement method defined by an RRC signal which is a dedicated control signal transmitted from the eNB in an RRC_connected state.

Since an estimation or measurement element which may be included in a low-level low-cost terminal such as an MTC terminal is also restricted, there is a need for a method of adaptively performing estimation or measurement using the restricted estimation or measurement element.

SUMMARY OF THE INVENTION

Accordingly, the present invention is directed to a method for measuring a neighboring cell and an apparatus thereof that substantially obviate one or more problems due to limitations and disadvantages of the related art.

An object of the present invention is to provide a method of adaptively performing estimation or measurement using a restricted estimation or measurement element Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing intra-frequency cell measurement by a user equipment (UE) in a wireless communication system includes determining a measurement gap for the intra-frequency cell measurement based on downlink control information received from an eNB; and performing the intra-frequency cell measurement for a neighboring cell during the measurement gap, wherein the measurement gap corresponds to one or more downlink subframes other than a downlink subframe having downlink data for the UE indicated by the downlink control information.

The length of the measurement gap may be adjustable based on the downlink control information.

The measurement gap may be present over one or more downlink subframes.

The method may further include transmitting data to the eNB in uplink during the measurement gap.

The performing intra-frequency cell measurement may include measuring a reference signal received quality (RSRQ) or a reference symbol received power (RSRP) from the neighboring cell.

The method may further include receiving, from the eNB, information on whether uplink transmission is granted or whether the measurement gap is allowed to be used, and the information may be received via a higher layer signal.

The method may further include reporting result of the intra-frequency cell measurement to the eNB, and the reporting is performed using a periodic method, an event triggering method or a combination thereof.

The method may further include setting a switching time before and after the measurement gap, and the switching time may be a period during which switching between channel estimation and intra-frequency cell measurement occurs.

In another aspect of the present invention, a user equipment (UE) configured to perform intra-frequency cell measurement in a wireless communication system includes a radio frequency (RF) unit configured to transmit or receive a radio signal; and a processor configured to control the RF unit, wherein the processor is configured to determine a measurement gap for the intra-frequency cell measurement based on downlink control information received from an eNB and to perform intra-frequency cell measurement for a neighboring cell during the measurement gap, and wherein the measurement gap corresponds to one or more downlink subframes other than a downlink subframe having downlink data for the UE indicated by the downlink control information.

The processor may be configured to adjust the length of the measurement gap based on the received downlink control information.

The measurement gap may be present over one or more downlink subframes.

The processor may be configured to transmit data to the eNB in uplink during the measurement gap.

The processor may be configured to measure a reference signal received quality (RSRQ) or a reference symbol received power (RSRP) of a downlink signal from the neighboring cell during the measurement gap.

The processor may be configured to receive, from the eNB, information on whether uplink transmission is granted or whether the measurement gap is allowed to be used, and the information may be received via a higher layer signal.

The processor may be configured to report result of the intra-frequency cell measurement to the eNB, and reporting may be performed using a periodic method, an event triggering method or a combination thereof.

The processor may be configured to set a switching time before and after the measurement gap, and the switching time may be a period during which switching between channel estimation of the UE and intra-frequency cell measurement occurs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, a machine type communication (MTC) terminal, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowelegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH. In the present invention, transmission of a PDCCH/PCFICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

Figure 1:
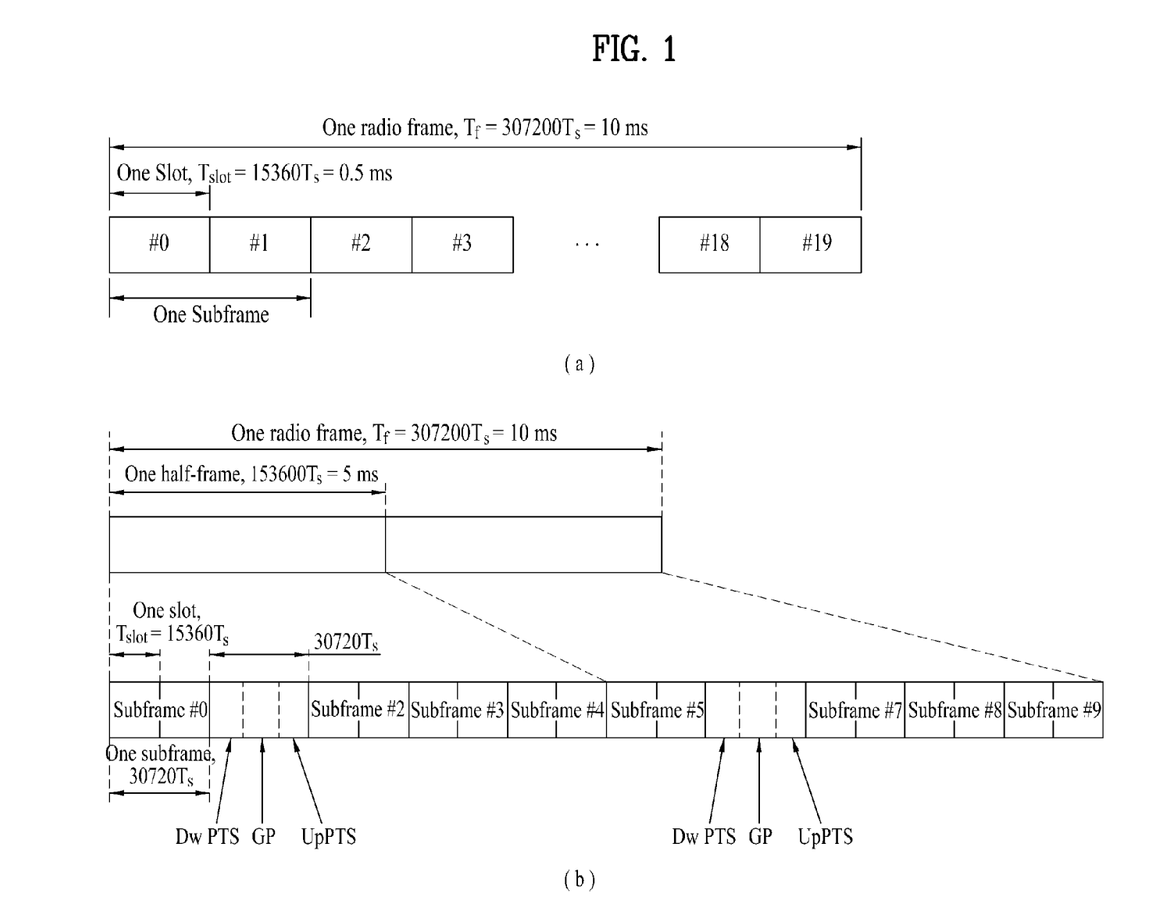
FIG. 1 is a diagram showing an example of a radio frame structure used in a wireless communication system.

FIG. 1 is a diagram showing the structure of a radio frame used in a wireless communication system. In particular, FIG. 1(a) shows a radio frame structure used in frequency division duplex (FDD) in 3GPP LTE(-A) and FIG. 1(b) shows a radio frame structure used in time division duplex (TDD) in 3GPP LTE(-A).

Referring to FIG. 1, a radio frame used in 3GPP LTE(-A) has a length of 10 ms ($307200 \cdot T_s$) and includes 10 subframes with the same size. The 10 subframes of the radio frame may be numbered. $T_s$ denotes sampling time, and is represented by $T_s=1/(2048*15 \text{ kHz})$. Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

Figure 2:
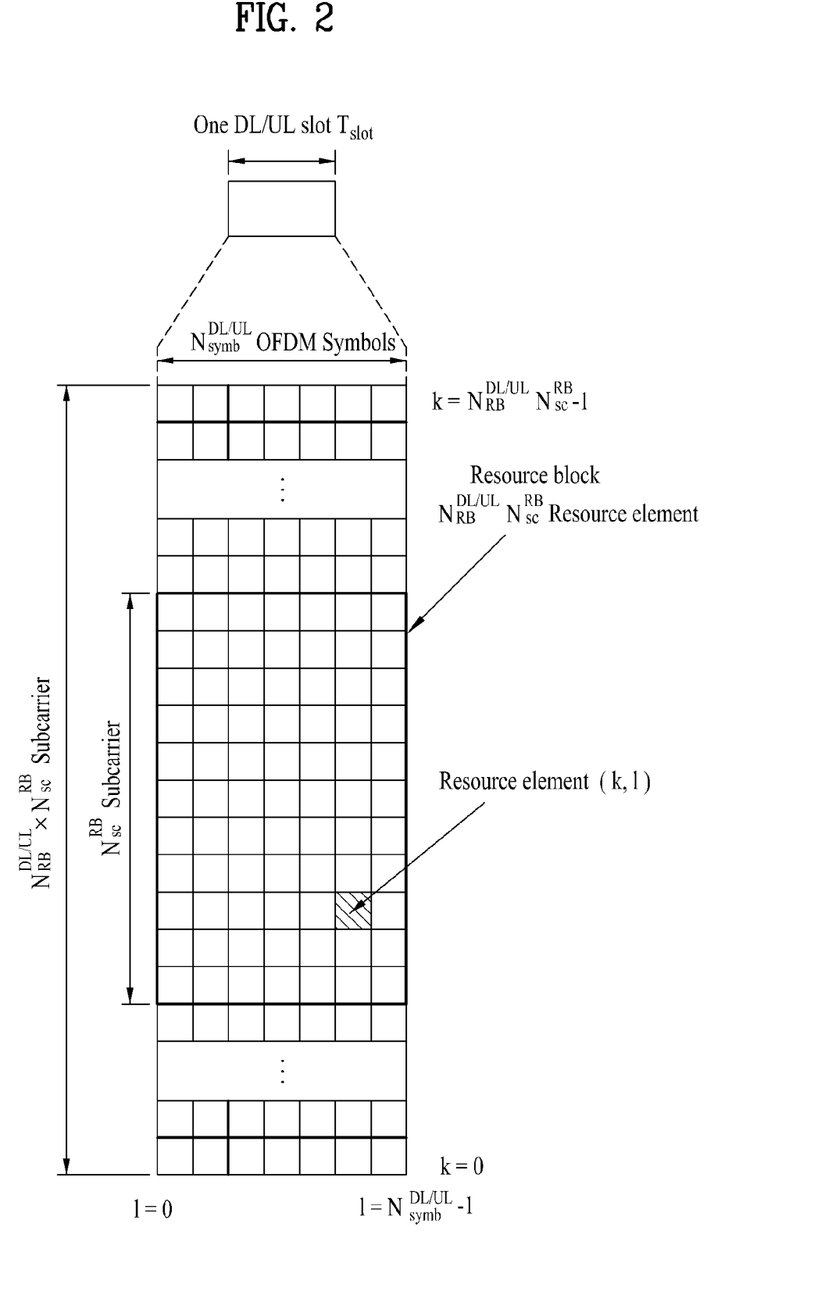
FIG. 2 is a diagram showing an example of a downlink/uplink (DL/UL) slot structure in a wireless communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N^{DL/UL}_{RB}*N^{RB}_{sc}$ subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g., 7) consecutive OFDM symbols in a time domain and defined as $N^{RB}_{sc}$ (e.g., 12) consecutive subcarriers in a frequency domain. For reference, resource including one OFDM symbol and one subcarrier is referred to as a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index applied from 0 to $N^{DL/UL}_{RB}*N^{RB}_{sc}-1$ in a frequency domain, and l is an index from 0 to $N^{DL/UL}_{symb}-1$ in a time domain.

In one subframe, two RBs respectively located in two slots of the subframe while occupying the same $N^{RB}_{sc}$ consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, $n_{PRB}=n_{VRB}$. The localized VRBs are numbered from 0 to $N^{DL}_{VRB}-1$ and $N^{DL}_{VRB}=N^{DL}_{RB}$. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
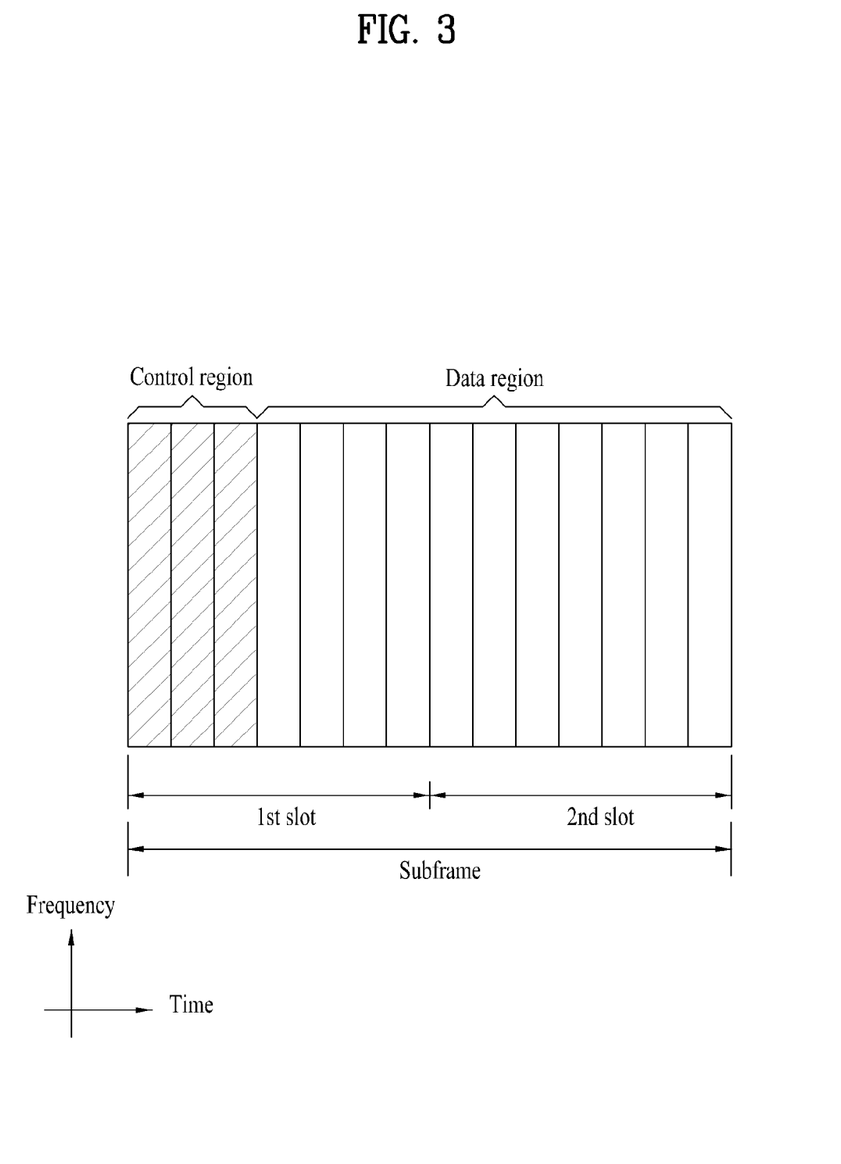
FIG. 3 is a diagram showing a downlink subframe structure used in a 3GPP LTE(-A) system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
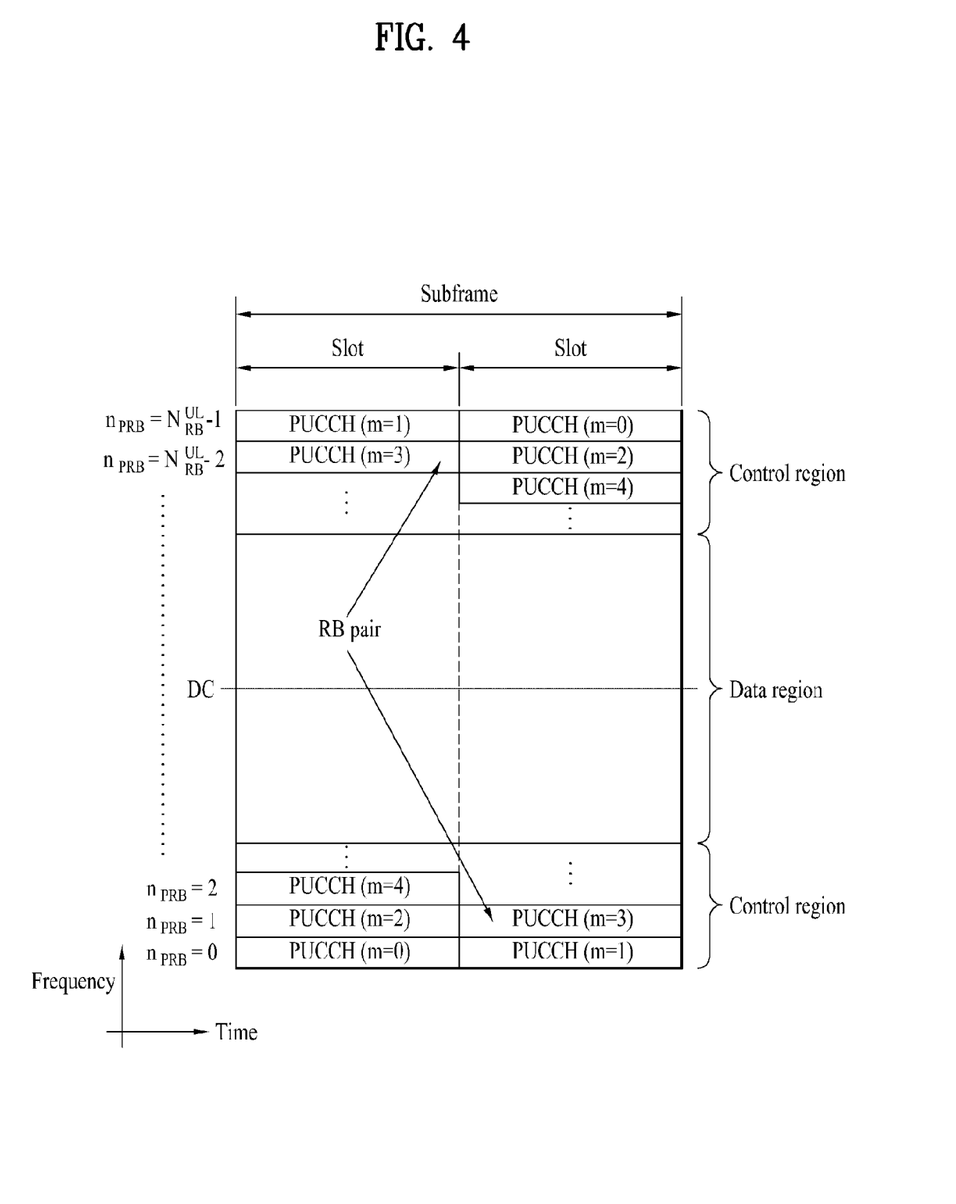
FIG. 4 is a diagram showing an example of an uplink subframe structure used in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

Figure 5A:
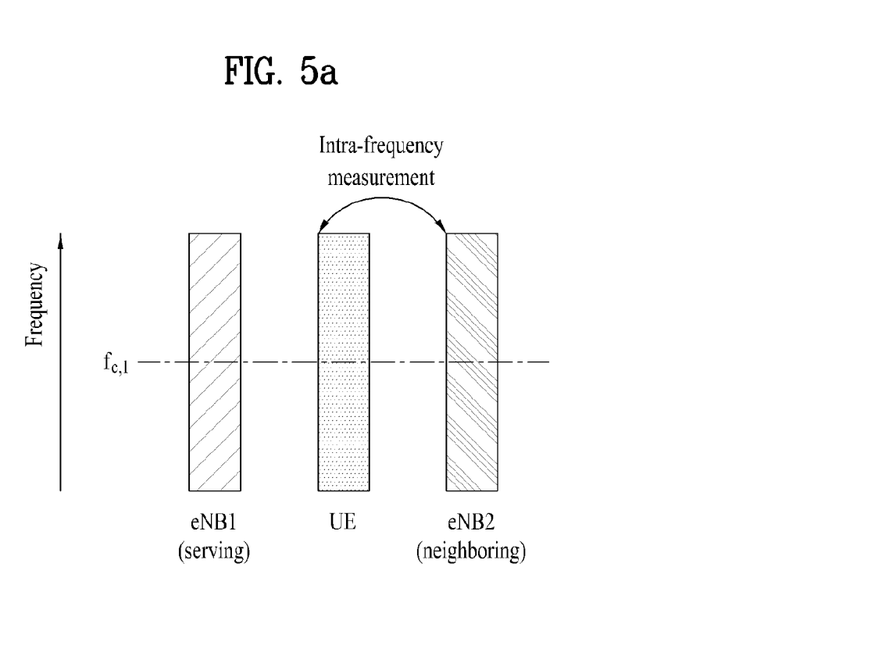
FIG. 5a and FIG. 5b are diagrams showing an example of an intra-frequency measurement and an inter-frequency measurement.
Figure 5B:
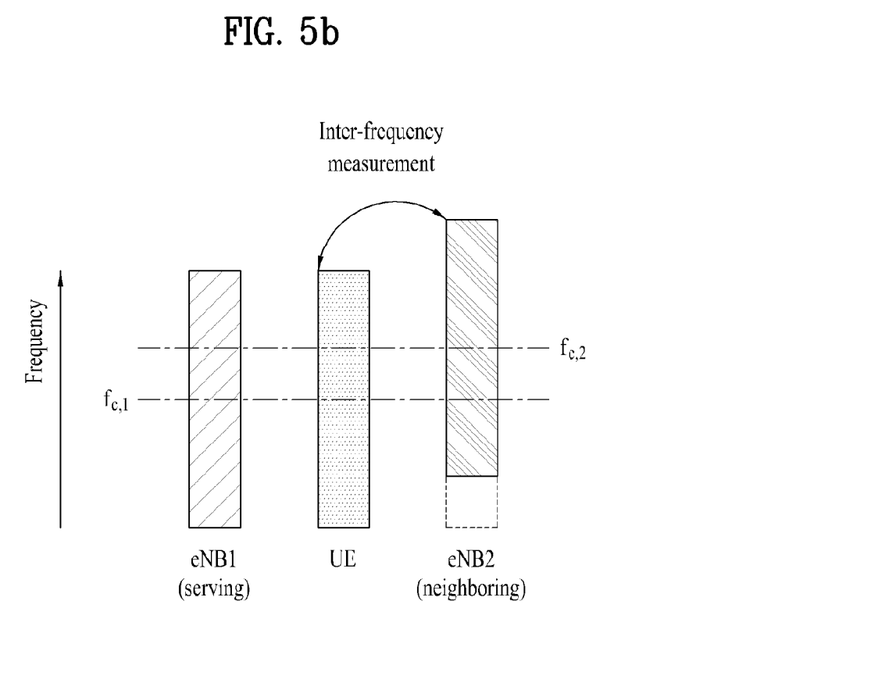

FIG. 5a and FIG. 5b are diagrams showing an example of intra-frequency measurement and inter-frequency measurement.

Intra-frequency measurement is applicable when a serving cell $eNB_1$ for currently providing data and a neighboring cell $eNB_2$ to be measured operate at the same carrier frequency $f_{c,1}$ as shown in FIG. 5a. At this time, if a UE separately operates an estimator with respect to the serving cell and the neighboring cell, since data channel estimation and neighboring cell physical layer measurement may be simultaneously performed, a separate measurement gap is not required.

In contrast, inter-frequency measurement is applicable when a serving cell $eNB_1$ for currently providing data and a neighboring cell $eNB_2$ to be measured operate at different carrier frequencies $f_{c,1}$ and $f_{c,2}$, respectively as shown in FIG. 5b. In order to perform physical layer measurement for the neighboring cell, a carrier frequency of an oscillator should be changed. However, in general, a UE has a single oscillator due to cost constraints and the oscillator simultaneously controls carrier frequencies of uplink and downlink. Accordingly, when the carrier frequency of the oscillator is changed for physical layer measurement, downlink data reception and uplink data transmission may not be performed. This leads to time and frequency resource waste.

Accordingly, the present application proposes a method of adaptively using a single estimator as necessary by introducing a measurement gap in both intra-frequency measurement and inter-frequency measurement. Further, the present application proposes a method of setting a switching time at start and end points of the measurement gap when a UE performs a physical layer measurement operation. For example, if it is assumed that the UE has a single estimator, data channel estimation and neighboring cell physical layer measurement may not be simultaneously performed. At this time, the single estimator may be used to perform a selected operation (one of channel estimation of a serving cell and physical layer measurement of a neighboring cell). In addition, a data transmission method restricted by the measurement gap is changed according to measurement methods, thereby providing a flexible structure. Hereinafter, according to an embodiment of the present invention, an operation of adaptively using a single estimator via a measurement gap by an UE will be described.

Figure 6:
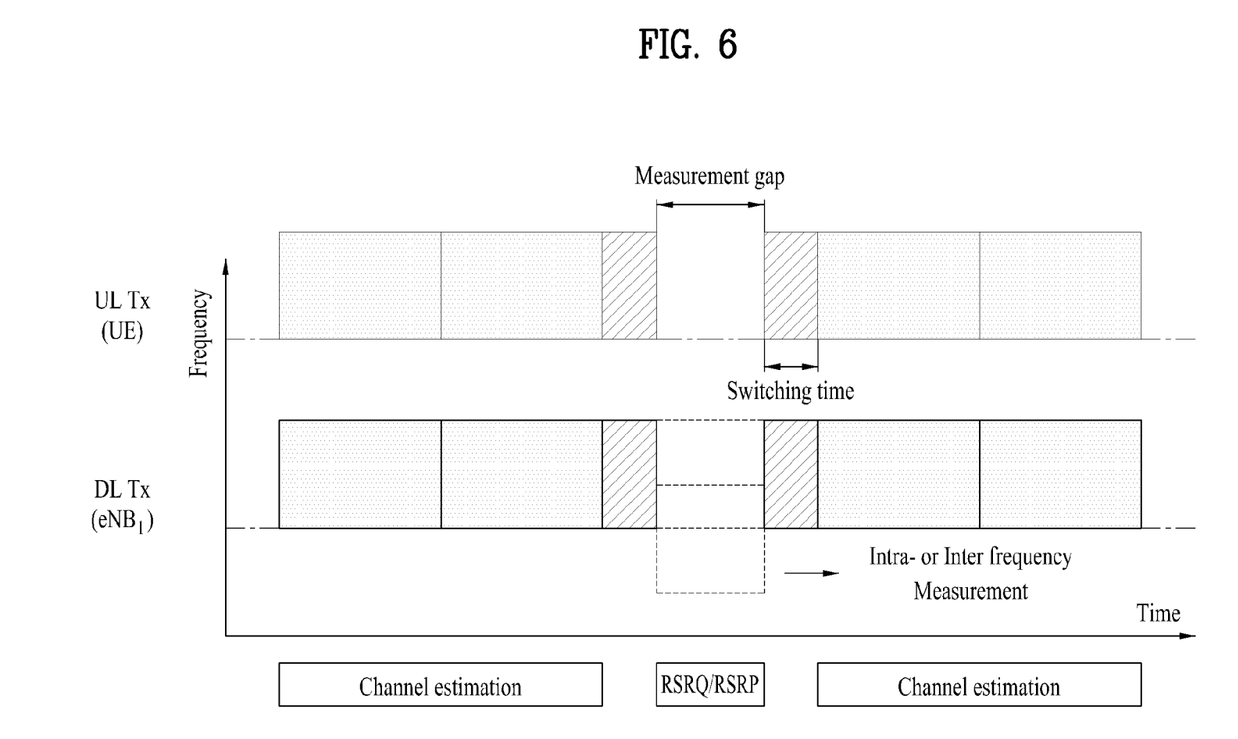
FIG. 6 is a diagram showing measurement of a neighboring cell within a measurement gap in which there is no data transmission/reception.

FIG. 6 is a diagram showing measurement of a neighboring cell within a measurement gap in which there is no data transmission/reception. FIG. 6 shows an embodiment in which a measurement gap in which there is no data transmission/reception is used to perform physical layer measurement of a neighboring cell. The operation described with reference to FIG. 6 may be used in both an intra-frequency measurement and an inter-frequency measurement.

At this time, the UE uses a single estimator for channel estimation of a data channel of a serving cell $eNB_1$ outside the measurement gap and uses the single estimator for physical layer measurement of a neighboring cell $eNB_2$ within the measurement gap. Within the measurement gap, the UE may measure a reference signal received quality (RSRQ) or a reference symbol received power (RSRP) from the neighboring cell so as to perform physical layer measurement.

Within the measurement gap, since the single estimator of the UE is used for physical layer measurement but is not used for channel estimation, the channel state in the measurement gap is not applied to data transmission/reception. Accordingly, as shown in FIG. 6, no data transmission/reception is performed within the measurement gap. In the inter-frequency measurement method, it may be shown that the carrier frequency is changed using the single oscillator for physical layer measurement of the neighboring cell $eNB_2$ within the measurement gap. Accordingly, in the inter-frequency measurement method, data transmission and reception of the UE, that is, uplink data transmission and downlink data reception, are impossible within the measurement gap. Even when the intra-frequency measurement method is applied, uplink data transmission and downlink data reception are impossible.

In addition, a switching time for switching basic settings such as a scrambling ID of a neighboring cell may be set at start and end points of a measurement gap. That is, the switching time is a time for enabling the UE to switch between channel estimation for the serving cell and intra-frequency measurement of the neighboring cell. The switching time may have an insignificant value or may be ignored according to circumstances under which the embodiment is complemented.

The measurement gap may be determined by the UE based on a PDCCH from a serving cell or an $eNB_1$ which serves as a serving cell to the UE. The UE may confirm presence/absence of downlink data allocated thereto, that is, a PDSCH, via control information of the PDCCH. The UE may determine the measurement gap within the time period corresponding to one or more subframes other than the subframe of the PDSCH allocated thereto.

Under such an environment, since there is no PDSCH allocated to the UE within the measurement gap, the UE does not need to perform channel estimation for the serving cell. Accordingly, the UE may measure the physical layer of the cell (that is, the neighboring cell) other than the serving cell via the single estimator within the measurement gap.

Figure 7:
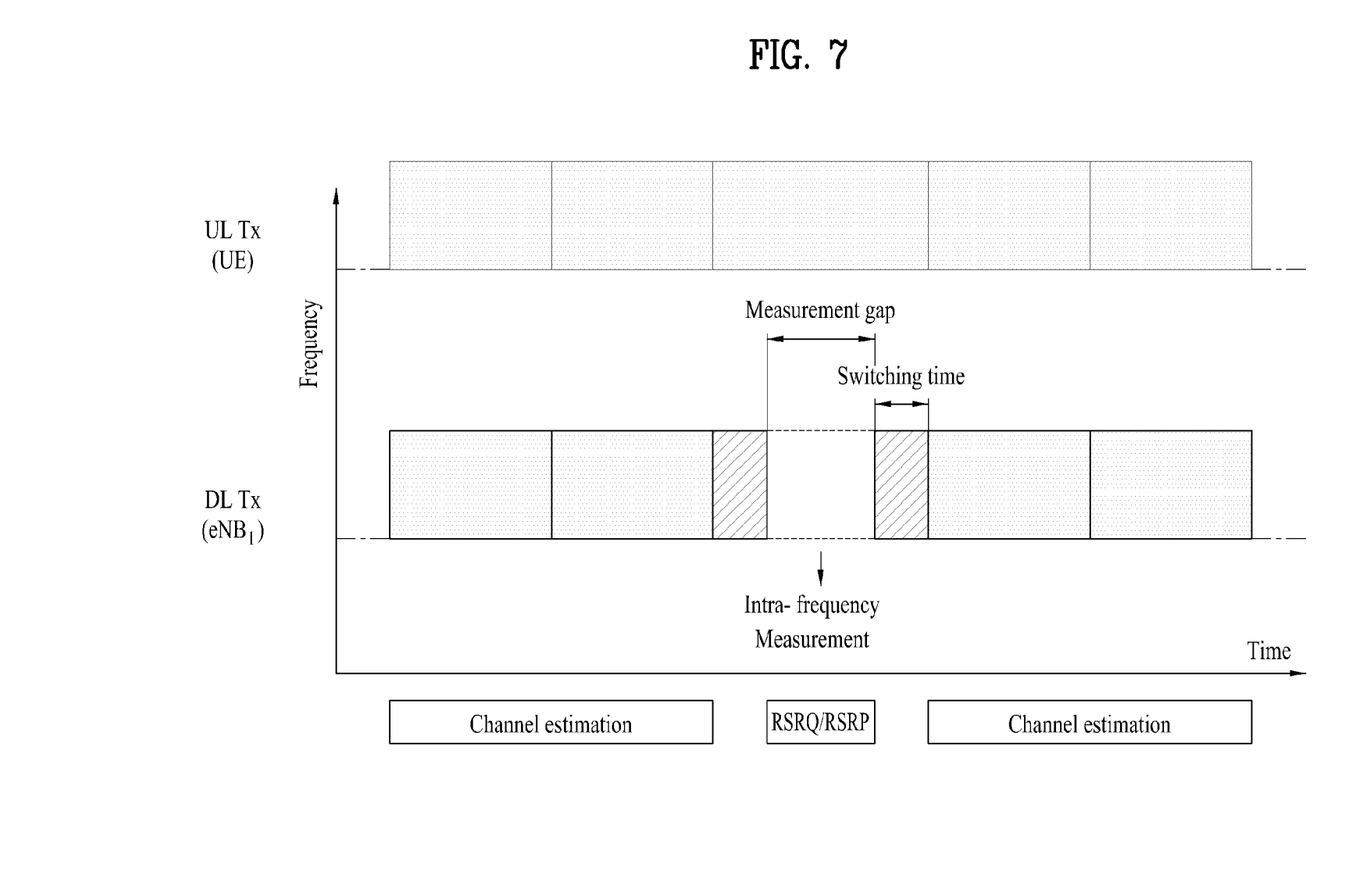
FIG. 7 is a diagram showing an intra-frequency measurement of a neighboring cell within a measurement gap in which data transmission can be performed by a UE (User Equipment)

FIG. 7 is a diagram showing an intra-frequency measurement of a neighboring cell within a measurement gap in which data transmission can be performed by a UE (User Equipment).

In the embodiment associated with FIG. 7, the operation of the intra-frequency measurement method in which the serving cell and the neighboring cell of the UE operate at the same carrier frequencies will be described. In other words, the embodiment associated with FIG. 7 describes the operation for performing physical layer measurement of the neighboring cell within the measurement gap in which data transmission is performed (that is, UL is available) but data reception is not performed (that is, DL is not available).

Unlike the intra-frequency measurement method, the inter-frequency measurement method should change the carrier frequency via the oscillator. This leads to change in the carrier frequency in both uplink and downlink and thus uplink and downlink may not allow to be used. However, in the intra-frequency measurement method, the serving cell and the neighboring cell of the UE operate at the same carrier frequencies, the UE may transmit data to the eNB via an uplink channel even when physical layer measurement of the neighboring cell is performed by the UE via a downlink channel within the measurement gap. Referring to an uplink part shown in the top of FIG. 7, it can be seen that uplink data transmission is possible (the channel is not disconnected along a time axis).

Within the measurement gap, the single estimator of the UE is used to measure the physical layer of the neighboring cell $eNB_2$ and thus data reception may not be performed within the measurement gap. Within the measurement gap, the UE may measure a reference signal received quality (RSRQ) or a reference symbol received power (RSRP) of a downlink signal from the neighboring cell so as to perform physical layer measurement. At this time, the serving cell or the eNB which serves as the serving cell may inform the UE as to whether the measurement gap is available and whether data transmission is granted via a higher layer signal. The UE may report result of the measurement to the $eNB_1$. The reporting may be performed using periodic method, event-triggered method, or a combination thereof.

For reference, in FIG. 7, data reception of the UE being not performed within the measurement gap means that data received by the UE is not recovered (by a series of processes performed by a data reception side, such as demodulation and decoding) and data which a data transmission side (that is, $eNB_1$) desires to transmit to the UE is not acquired. However, it does not mean that data which is subjected to signal processing (a series of processes performed by the data transmission side, such as coding and modulation) at the data transmission side is not received. In other words, since the data transmitted by the data transmission side ($eNB_1$) is received by the UE but channel estimation is not performed within the measurement gap, the received data is not subjected to demodulation, etc. Thus, the UE is not able to detect which data is received.

Figure 8:
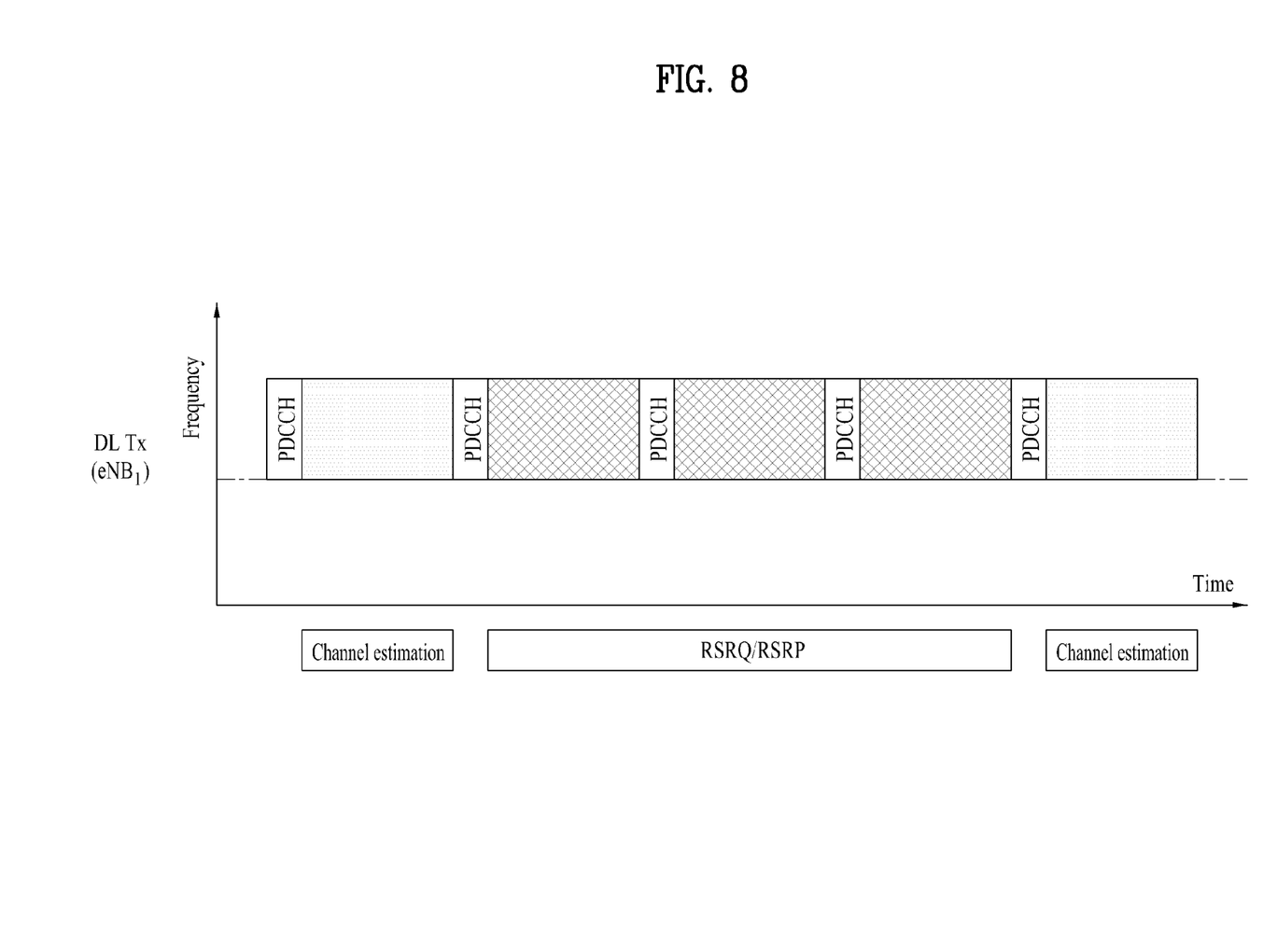
FIG. 8 is a diagram showing measurement of a neighboring cell through a number of subframes within a measurement gap.

FIG. 8 is a diagram showing measurement of a neighboring cell through a number of subframes within a measurement gap.

According to the embodiment associated with FIG. 8, described is An operation for adjusting the length of the measurement gap depending on whether data transmission and reception is available when physical layer measurement of the neighboring cell is performed using the measurement gap. A low-cost UE such as an MTC terminal supports a low data transmission rate and a data transmission period may be very long. Accordingly, the present application proposes an operation for performing physical layer measurement of the neighboring cell for a long time by the UE while there is no data transmission/reception.

For example, in an LTE system, when the UE confirms that there is no data allocated thereto in a subframe via a control signal such as a PDCCH, the UE may perform a physical layer measurement operation for a neighboring cell within the subframe. At this time, physical layer measurement of the neighboring cell may be performed over a plurality of downlink subframes a shown in FIG. 8. In other words, the measurement gap may be determined within the time resources corresponding to one or more downlink subframes and measurement of the neighboring cell may be performed within the measurement gap. For example, if a PDCCH detected in a downlink subframe carries a downlink control information (DCI) indicating downlink grant, the UE may confirm that a PDSCH associated with the PDCCH is present in the subframe. In contrast, if the UE fails to detect the PDCCH thereof in a downlink subframe or detects the PDCCH thereof but the DCI included in the PDCCH is a DCI other than downlink grant DCI (e.g., a DCI indicating uplink grant), the UE determines that there is no PDSCH for the UE in the subframe and uses the downlink subframe in which the PDSCH is not present as the measurement gap.

Within the measurement gap, the UE may measure a reference signal received quality (RSRQ) or a reference symbol received power (RSRP) of a downlink signal from the neighboring cell so as to perform physical layer measurement.

Figure 9:
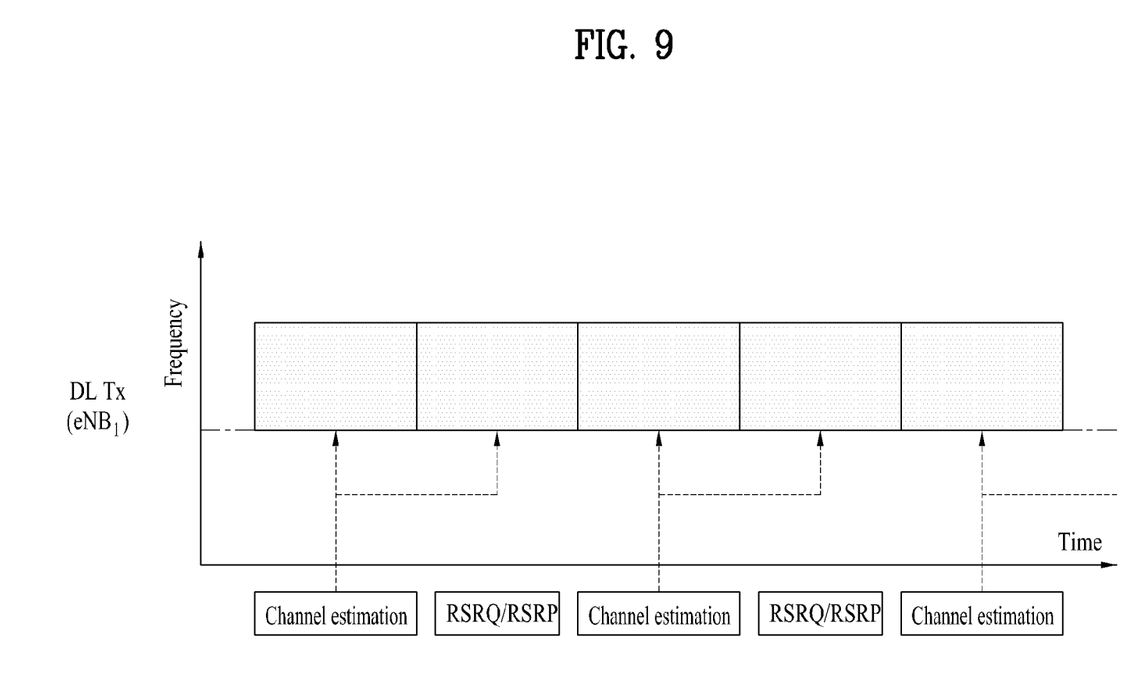
FIG. 9 is a diagram showing measurement of a neighboring cell using a single channel estimator in case of that a change of the channel state is slow.

FIG. 9 is a diagram showing measurement of a neighboring cell using a single channel estimator in case that a change of the channel state is slow.

According to the embodiment associated with FIG. 9, described is an operation for simultaneously performing data reception and physical layer measurement of a neighboring cell using a single estimator in a communication environment in which a channel state is slowly changed. If a low-cost UE such as an MTC terminal is implemented in an apparatus having low mobility or a fixed apparatus, the channel state may be slowly changed. In such an environment, the single estimator is preferably used to measure a surrounding environment, rather than being used for channel estimation of the serving cell in every data reception time. In other words, since the channel state is slowly changed, the result of the previously estimated channel state is replaced with a channel state estimation value at a current data reception time and the single estimator may be used for physical layer measurement of the neighboring cell.

The speed (slow or fast) of the change in channel state may be calculated/determined by the serving cell or the eNB which serves as the serving cell via periodic or aperiodic reporting of the channel state information from the UE. For example, the serving cell or the eNB may detect a difference between $(M-1)^{th}$ received channel state information and $M^{th}$ received channel state information so as to detect a change in channel state. The change in channel state may include a channel size difference according to CQI, a channel direction difference according to PMI, etc.

However, if physical layer measurement of the neighboring cell is performed regardless of the change in channel state, errors occur in a received data (e.g., a PDSCH) recovered by the UE if the channel state is significantly changed. Accordingly, in the operation according to the present embodiment, a threshold of the change speed of the channel state is set and the operation according to the present embodiment is preferably applied if the change speed of the channel state is less than the threshold. The threshold is preferably a value in which errors occurring in a process of recovering the received data may be ignorable and reliability of demodulation of the received data can be ensured.

Accordingly, in the embodiment associated with FIG. 9, the measurement gap is not required and the UE may measure a reference signal received quality (RSRQ) or a reference symbol received power (RSRP) of a downlink signal from the neighboring cell in a period using a previous channel estimation result so as to perform physical layer measurement. In other words, the UE may perform physical layer measurement of the neighboring cell while performing decoding and/ or demodulation of the received data based on the previous channel estimation result in a predetermined period.

Figure 10:
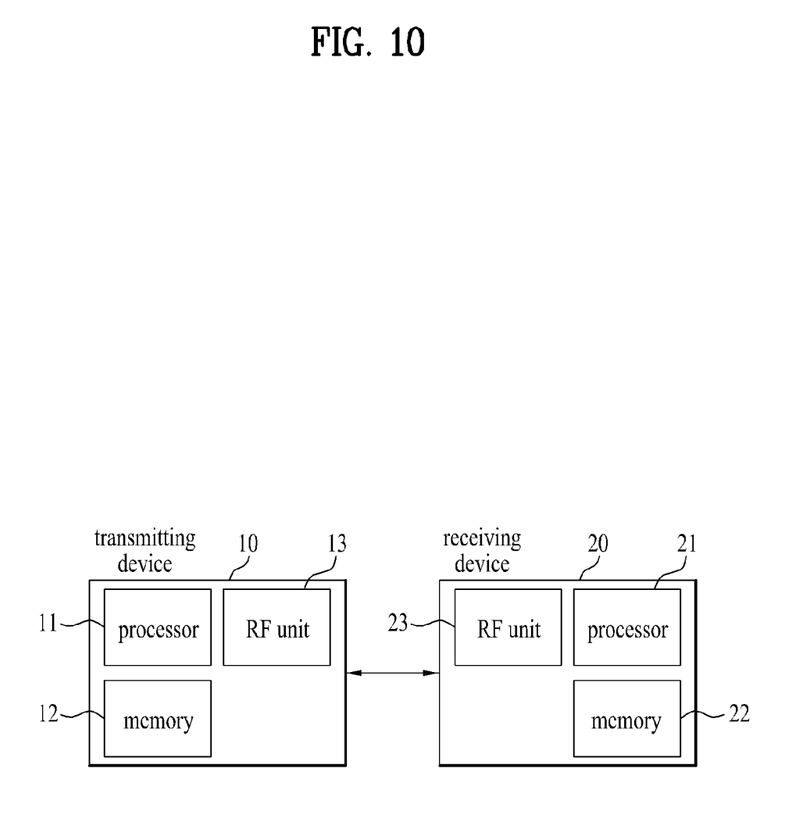
FIG. 10 is a block diagram of an apparatus for measuring a neighboring cell according to an embodiment of the present invention.

FIG. 10 is a block diagram showing components of a transmitter 10 and a receiver 20 for performing the present invention.

The transmitter 10 and the receiver 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signal. The memories 12 and 22 may be used as a buffer.

The processors 11 and 21 generally control the overall operation of the various modules of the transmitter and the receiver. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), Digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the function or operations of the present invention. The firmware or software configured to perform the present invention may be included in the processors 11 and 21 or stored in the memories 12 and 22 so as to be operated by the processors 11 and 21.

The processor 11 of the transmitter 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted to K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include Nt (Nt being a positive integer) transmit antennas.

Signal processing of the receiver 20 is the inverse of signal processing of the transmitter 10. Under control the processor 21, the RF unit 23 of the receiver 20 receives a radio signal transmitted by the transmitter 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitter 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiver 20. A reference signal (RS) transmitted in correspondence with the antenna defines the antenna viewed from the viewpoint of the receiver 20 and enables the receiver 20 to perform channel estimation of the antenna regardless of whether the channel is a single radio channel from a single physical antenna or a composite channel from a plurality of physical antennal elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE or a relay operate as the transmitter 10 in uplink and operates as the receiver 20 in downlink. In the embodiments of the present invention, a BS operates as the receiver 20 in uplink and operates as the transmitter 10 in downlink.

Hereinafter, the processor, the memory and the RF unit included in the BS are referred to as a BS processor, a BS memory and a BS RF unit and the processor, the memory and the RF unit included in the UE are referred to as a UE processor, a UE memory and a UE RF unit. In the present invention, the BS processor may be a processor located at a BS or may be a BS controller connected to a BS via a cable or a dedicated line and configured to control the BS.

Hereinafter, downlink will be described. Accordingly, the transmitter 10 corresponds to the BS and the receiver 20 corresponds to the UE. The receiver 20 may correspond to a UE configured to perform intra-frequency cell measurement in a wireless communication system. The receiver 20 may include a RF unit 23 configured to transmit or receive the radio signal and a processor 21 configured to control the RF unit. The receiver 20 may include a memory 22 configured to store a series of data including information necessary to perform communication with the BS.

The processor 21 may determine a measurement gap for intra-frequency cell measurement based on a PDCCH received from the BS. The measurement gap may correspond to time resources capable of performing intra-frequency cell measurement of a neighboring cell. In other words, the measurement gap corresponds to one or more downlink subframes other than a downlink subframe having downlink data for the UE indicated by downlink control information.

The measurement gap may be determined to be present over one or more downlink subframes or to include one or more downlink subframes.

The processor 21 may be configured to measure a reference signal received quality (RSRQ) or a reference symbol received power (RSRP) of a downlink signal from the neighboring cell during the measurement gap.

The length of the measurement gap may be adjusted based on control information transmitted via the received PDCCH. The processor 21 may determine at least part of the time resources, in which the PDSCH allocated to the UE is not present, as the measurement gap.

The processor 21 may be configured to transmit data to the BS in uplink during the measurement gap.

The processor 21 is configured to receive, from the BS, information on whether uplink transmission is granted or whether the measurement gap is allowed to be used. The information may be transmitted via a higher layer signal.

The processor 21 is configured to report the intra-frequency cell measurement result to the BS. The reporting may be performed a periodic method, an event triggering method or a combination thereof. Such a reporting method may be provided to the UE via a higher layer signal.

The processor 21 is configured to a switching time before and after the measurement gap and the switching time is a time period during which switching between channel estimation and intra-frequency cell measurement occurs.

Another embodiment described with reference to FIG. 10 will be described. The processor 21 may divide time resources allocated to the UE into a first time resource and a second time resource. The first time resource may be resource for estimation or measurement of the channel state of a serving cell to which the UE belongs and the second time resource may be resource for estimation or measurement of the channel state of a neighboring cell of the serving cell to which the UE belongs. The first time resource and the second time resource may be determined based on downlink control information (e.g., PDSCH) received from the BS. The first time resource and the second time resource may be contiguously located on a time axis and a constant time interval may be present between the first time resource and the second time resource.

More specifically, the processor 21 may determine a time resource corresponding to the PDSCH allocated to the UE as the first time resource and determine the time resource corresponding to the PDSCH which is not allocated to the UE (that is, a PDSCH for another UE) as the second time resource via the downlink control information. The processor 21 may select or determine at least part of the second time resource as the measurement gap for estimation or measurement of the channel state of the neighboring cells. The length of the measurement gap may be dynamically determined within the second time resource. The second time resource may correspond to a time resource corresponding to at least one downlink subframe and thus the measurement gap may correspond to a time resource corresponding to at least one downlink subframe. As described above, during the measurement gap, the process 21 may measure an RSRQ or RSRP of the neighboring cell and report the RSRQ or RSRP to the BS. The reporting method may be performed using a periodic method, an event triggering method or a combination thereof and the method may be configured by a higher layer signal.

Although the term "estimation" or "measurement" is used in the specification of the present invention, the term "estimation" or "measurement" indicates that the channel state or the physical layer state observed from one UE is estimated, calculated or measured. Although the term "estimator" is used in the specification of the present invention, the term "estimator" indicates a means for estimating, calculating or measuring the channel state or the physical layer state.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The embodiments of the present invention may be used in a user equipment or other equipments in a wireless communication system.

According to the embodiments of the present invention, it is possible to efficiently perform channel estimation and physical layer measurement given restricted time resources.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing intra-frequency cell measurement by a user equipment (UE) in a wireless communication system, the method comprising:
   determining a measurement gap for the intra-frequency cell measurement based on downlink control information received from an eNB; and
   performing the intra-frequency cell measurement for a neighboring cell in downlink (DL) and transmitting data to the eNB in uplink (UL) simultaneously at a specific time during the measurement gap,
   wherein the measurement gap corresponds to one or more downlink subframes other than a downlink subframe having downlink data for the UE indicated by the downlink control information.

2. The method according to claim 1, wherein the length of the measurement gap is adjustable based on the downlink control information.

3. The method according to claim 1, wherein the measurement gap is present over one or more downlink subframes.

4. The method according to claim 1, wherein the performing intra-frequency cell measurement includes measuring a reference signal received quality (RSRQ) or a reference symbol received power (RSRP) from the neighboring cell.

5. The method according to claim 1, further comprising receiving, from the eNB, information on whether uplink transmission is granted or whether the measurement gap is allowed to be used,
   wherein the information is received via a higher layer signal.

6. The method according to claim 1, further comprising reporting result of the intra-frequency cell measurement to the eNB,
   wherein the reporting is performed using a periodic method, an event triggering method or a combination thereof.

7. The method according to claim 1, further comprising setting a switching time before and after the measurement gap,
   wherein the switching time is a period, during which switching between channel estimation and intra-frequency cell measurement occurs.

8. A user equipment (UE) configured to perform intra-frequency cell measurement in a wireless communication system, the UE comprising:
   a radio frequency (RF) unit configured to transmit or receive a radio signal; and a processor configured to control the RF unit, wherein the processor is configured to determine a measurement gap for the intra-frequency cell measurement based on downlink control information received from an eNB and to perform the intra-frequency cell measurement for a neighboring cell in downlink (DL) and transmit data to the eNB in uplink (UL) simultaneously at a specific time during the measurement gap, and wherein the measurement gap corresponds to one or more downlink subframes other than a downlink subframe having downlink data for the UE indicated by the downlink control information.

9. The UE according to claim 8, wherein the processor is configured to adjust the length of the measurement gap based on the received downlink control information.

10. The UE according to claim 8, wherein the measurement gap is present over one or more downlink subframes.

11. The UE according to claim 8, wherein the processor is configured to measure a reference signal received quality (RSRQ) or a reference symbol received power (RSRP) from the neighboring cell during the measurement gap.

12. The UE according to claim 8, wherein the processor is configured to receive, from the eNB, information on whether uplink transmission is granted or whether the measurement gap is allowed to be used, wherein the information is received via a higher layer signal.

13. The UE according to claim 8, wherein the processor is configured to report result of the intra-frequency cell measurement to the eNB, wherein the reporting is performed using a periodic method, an event triggering method or a combination thereof.

14. The UE according to claim 8, wherein the processor is configured to set a switching time before and after the measurement gap, wherein the switching time is a period during which switching between channel estimation and intra-frequency cell measurement occurs.

* * * * *